United States Patent
Stadter

(10) Patent No.: US 10,614,267 B2
(45) Date of Patent: Apr. 7, 2020

(54) METHOD AND SYSTEM FOR TWO-WAY COMMUNICATION USING DATA-FIELD BASED TEMPLATES

(71) Applicant: RUSHHIVE, LLC, Atlanta, GA (US)

(72) Inventor: Eric John Stadter, Atlanta, GA (US)

(73) Assignee: RUSHHIVE, LLC, Atlanta, GA (US)

( * ) Notice: Subject to any disclaimer, the term of this patent is extended or adjusted under 35 U.S.C. 154(b) by 122 days.

(21) Appl. No.: 15/873,461

(22) Filed: Jan. 17, 2018

(65) Prior Publication Data

US 2018/0203840 A1 Jul. 19, 2018

Related U.S. Application Data

(60) Provisional application No. 62/447,481, filed on Jan. 18, 2017.

(51) Int. Cl.
| | |
|---|---|
| *G06F 40/186* | (2020.01) |
| *H04L 29/06* | (2006.01) |
| *G06F 16/958* | (2019.01) |
| *G06F 40/106* | (2020.01) |
| *G06F 16/25* | (2019.01) |
| *G06F 40/174* | (2020.01) |

(52) U.S. Cl.
CPC .......... *G06F 40/186* (2020.01); *G06F 16/958* (2019.01); *G06F 40/106* (2020.01); *H04L 65/1069* (2013.01); *H04L 65/40* (2013.01); *G06F 16/252* (2019.01); *G06F 40/174* (2020.01)

(58) Field of Classification Search
CPC .... G06F 16/252; G06F 16/958; G06F 17/212; G06F 17/243; G06F 17/248; H04L 65/40; H04L 65/1069; H04L 67/26; H04L 67/1095; G06Q 50/01
See application file for complete search history.

(56) References Cited

U.S. PATENT DOCUMENTS

| | | | |
|---|---|---|---|
| 9,313,209 B2 | 4/2016 | Corr et al. | |
| 2010/0063925 A1 | 3/2010 | Heston et al. | |
| 2011/0196695 A1 | 8/2011 | Ye et al. | |
| 2012/0303425 A1 | 11/2012 | Katzin et al. | |
| 2014/0067702 A1* | 3/2014 | Rathod | G06Q 10/10 705/319 |
| 2015/0269617 A1 | 9/2015 | Mikurak | |
| 2016/0306866 A1* | 10/2016 | Kuruganti | H04L 67/1095 |
| 2017/0163752 A1* | 6/2017 | Kaledhonkar | H04L 67/26 |

FOREIGN PATENT DOCUMENTS

WO  2012025485 A1  3/2012

* cited by examiner

*Primary Examiner* — Clayton R Williams
*Assistant Examiner* — Michael Li
(74) *Attorney, Agent, or Firm* — Traverse Legal, PLC

(57) ABSTRACT

What is provided is an efficient method and system of two-way communication using data-field based templates. The method and system allows individuals to more easily communicate information and data such that the most relevant information and data is readily received and accessed by the appropriate parties. This is particularly beneficial in allowing individuals to quickly accomplish routine events and allows anyone to have similar functionality without the knowledge of authoring a mobile application, themselves. In addition, the method and system disclosed herein allows for the tracking of transactions in one user interface from multiple originators (i.e. consolidating multiple tasks with different relationships in one place).

16 Claims, 12 Drawing Sheets

FIG. 8

| 12:30 | 84% |

Acrosstown, Georgia

Main Street Dog Daycare
We take care of all your pet needs!
1234 Anywhere Street

Hometown, Kentucky

Anywhere Chimney Services
Sweeps and inspections can be found with us
1234 Local Street

*(images of business/advertiser)*

*(various forms of contacting business/advertiser)*

Overnight Dog Boarding Request
Reserve your pet's boarding online with us!

Pet Bath
Let us know that you want a bath for your pet before pick-up

Update Contact Information
If your address or phone number changes, please let us know

|  |  |
|---|---|
| 12:30 | 84% |

Pending

| | |
|---|---|
| Request for Chimney Repair<br>Local Chimney Service | January 1, 2017 |
| Pet Bath<br>Main Street Dog Daycare | January 2, 2017 |

In Progress

| | |
|---|---|
| Make a Reservation<br>Corner Restaurant<br>1 Unread messages | January 3, 2017 |
| Overnight Dog Boarding Request<br>Main Street Dog Daycare | January 3, 2017 |

Completed

| | |
|---|---|
| Update Contact Information<br>Main Street Dog Daycare | January 10, 2017 |

Declined

| | |
|---|---|
| Leaf Removal Scheduling<br>Lawn Service of Yourtown<br>1 Unread messages | January 12, 2017 |

FIG. 12

METHOD AND SYSTEM FOR TWO-WAY COMMUNICATION USING DATA-FIELD BASED TEMPLATES

PRIORITY CLAIM

This patent application claims priority to and the benefit of the filing date of the provisional patent application U.S. Ser. No. 62/447,481 filed on Jan. 18, 2017, which is incorporated herein in its entirety.

FIELD

This patent application generally relates to efficient data communications, and more particularly to methods and systems for dynamic, two-way communication of data using data-field based templates.

BACKGROUND

Individuals routinely perform numerous daily, weekly, and monthly tasks, such as dropping off kids or pets at a particular daycare, dropping off clothes at a particular dry cleaner, going grocery shopping at a particular store, getting a haircut at a particular barber shop/salon, bringing a car to a particular mechanic, and going to work at a particular place of employment. Each of these tasks require some level of two-way communication between the individual and the particular shop/company. Typically, the individual establishes an ongoing relationship with the respective individual/shop/company and there is frequent two-way communication between both parties. The frequency of communication, the data transmitted within each communication, and the format/manner of each communication is specifically determined by the parties involved.

Consequently, the frequency of communication, the data transmitted within each communication, and the format/manner of each communication may be different in each instance of communication for each relationship. Individuals are regularly receiving large amounts of information and data in various formats of communication, such as email, text messages, postal mail, and phone calls. Due to the large amount of information and data being transmitted in a variety of formats, it is often difficult for individuals to efficiently and accurately parse through the information in order to identify the most important information to them at that time. As a result, important, time-sensitive information may not actually be viewed and acted upon by the desired party within the required time (if at all). In some instances, individuals may miss an important portion of an email message or simply not receive a text message at all.

Accordingly, there exists a need for a method and system of two-way communication that can allow an individual or company to determine their preferred methods and formats for communicating with other individuals and companies, particularly with those where an existing relationship already exists. The method and system should allow the individual and/or company to more efficiently and easily communicate, via two-way communication, with other individuals and companies to allow for the completion of routine tasks through a single platform. In addition, the method and system needs to allow its users to quickly identify and access the most relevant information and data, whether it is being transmitted in real-time or has been transmitted in previous communications between the respective parties.

SUMMARY

What is provided is an efficient method and system of two-way communication using data-field based templates. The method and system allows individuals to more easily communicate information and data such that the most relevant information and data is readily received and accessed by the appropriate parties. This is particularly beneficial in allowing individuals to quickly accomplish routine events and allows anyone to have similar functionality without the knowledge of authoring a mobile application, themselves. In addition, the method and system disclosed herein allows for the tracking of transactions in one user interface from multiple originators (i.e. consolidating multiple tasks with different relationships in one place).

In exemplary embodiments, a method of two-way communication between a plurality of users in a system comprises constructing, from a web browser or a first user computing device, at least one template associated with a first user; inserting, using the first user computing device, at least one data field into the template; the at least one data field defines information or data requested from at least one second user; and populating a plurality of data field-specific parameters associated with each data field and populating a plurality of template-specific parameters associated with each template. The method further comprises storing the template on a database server; publishing, using an API server, the template in the system for display to at least one second user; selecting, using a second user mobile computing device, one of the at least one templates and responding to the information or data requested in the template; transmitting to the system, using the second user mobile computing device, a submission comprising of the template completed by the second user and storing the submission on the database server; transmitting data associated with the submission, using the API server, from the database server to the first user computing device; notifying, using the API server, the first user that the submission has been received by the API server and is ready to be accessed; dynamically generating an action associated with the information or data provided to the first user in the submission; marking, using the first user computing device, the submission with a status update for display on the second user mobile computing device; and commencing two-way communication between the first user and the second user until the status update associated with the submission is designated as being terminated.

In exemplary embodiments, a system for two-way communication between a plurality of users comprises a first user computing device configured to construct at least one template associated with a first user, to insert at least one data field into the template, to populate a plurality of data field-specific parameters associated with each data field, to populate a plurality of template-specific parameters associated with each template, and to mark a submission comprising the template completed by the second user with a status update for display on a second user mobile computing device and the second user mobile computing device configured to select one of the at least one templates, to respond to the information or data requested in the template, and to transmit the submission to the system. The system further comprises at least one database server configured to store the template from the first user computing device and the submission from the second user mobile computing device; at least one API server configured to publish the template for display to the second user, to transmit data associated with the submission from the database server to the first user computing device or a web server and to notify the first user that the submission has been received by the API server and is ready to be accessed; and a computing platform with a graphical user interface configured for display of the information and data transmitted between the first user and the second user.

In an exemplary embodiment, a user becomes a subscriber to an advertiser by selecting at least one advertiser by browsing a public directory of available advertisers in the system and adding the advertiser to their list of favorites. In a second exemplary embodiment, a user becomes a subscriber to an advertiser when the advertiser sends a private invitation to the subscriber, which is visually captured in the web server and then transmitted through the API server. The invitation includes a link that allows the recipient to accept the invitation and connect with the advertiser. In a third exemplary embodiment, a user becomes a subscriber to an advertiser when the advertiser presents a unique code to the user for scanning by the subscriber mobile computing device.

In exemplary embodiments, the data field-specific parameters comprise a data type, a field description, a field name, and/or a field default value and the template-specific parameters comprising a proximity value, a template description, and a template name. In exemplary embodiments, the data field is configured to capture images, videos, and/or voice information from the second user.

The following detailed description together with the accompanying drawings will provide a better understanding of the nature and advantages of the present invention.

BRIEF DESCRIPTION OF THE DRAWINGS

Subject matter is particularly pointed out and distinctly claimed in the concluding portion of the specification. Claimed subject matter, however, as to structure, organization and method of operation, together with objects, features, and advantages thereof, may best be understood by reference to the following detailed description if read with the accompanying drawings in which:

FIG. 8 is a graphical user interface drawing illustrating an example GUI of a data-field based template depicted on a mobile software application for a subscriber;

FIG. 9 is a graphical user interface drawing illustrating an example GUI of the subscriber's advertisers;

FIG. 12 is a graphical user interface drawing illustrating an example GUI of a page in the mobile software application showing a summary view of the status of recent and open submissions for a subscriber.

DETAILED DESCRIPTION

Figure 1:
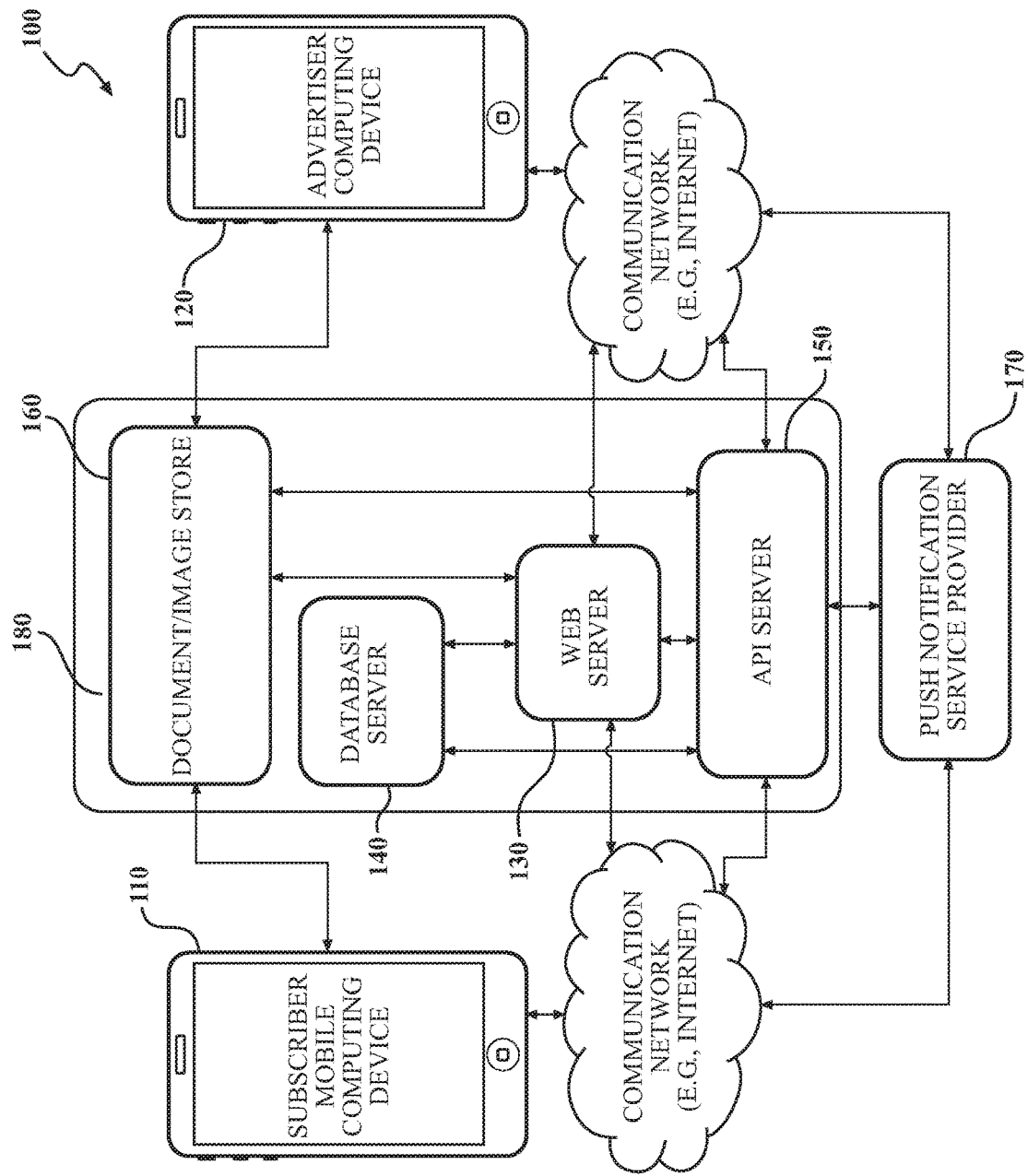
FIG. 1 is a system architecture diagram showing an exemplary system for conducting two-way peer-to-peer communication.

In the following detailed description, numerous specific details are set forth in order to provide a thorough understanding of the examples as defined in the claimed subject matter, and as an example of how to make and use the examples described herein. However, it will be understood by those skilled in the art that claimed subject matter is not intended to be limited to such specific details, and may even be practiced without requiring such specific details. In other instances, well-known methods, procedures, and components have not been described in detail so as not to obscure the examples defined by the claimed subject matter.

Some portions of the detailed description that follow are presented in terms of algorithms and/or symbolic representations of operations on data bits and/or binary digital signals stored within a computing system, such as within a computer and/or computing system memory. An algorithm is here and generally considered to be a self-consistent sequence of operations and/or similar processing leading to a desired result. The operations and/or processing may take the form of electrical and/or magnetic signals configured to be stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device that manipulates and/or transforms data represented as physical electronic and/or magnetic quantities and/or other physical quantities within the computing platform's processors, memories, registers, and/or other information storage, transmission, and/or display devices.

Unless specifically stated otherwise, as apparent from the following discussion, it is appreciated that throughout this specification a computing platform includes, but is not limited to, a device such as a computer or a similar electronic computing device that manipulates and/or transforms data represented by physical, electronic, and/or magnetic quantities and/or other physical quantities within the computing platform's processors, memories, registers, and/or other information storage, transmission, reception and/or display devices. Accordingly, a computing platform refers to a system, a device, and/or a logical construct that includes the ability to process and/or store data in the form of signals. Thus, a computing platform, in this context, may comprise hardware, software, firmware and/or any combination thereof. Where it is described that a user instructs a computing platform to perform a certain action, it is understood that "instructs" may mean to direct or cause to perform a task as a result of a selection or action by a user. A user may, for example, instruct a computing platform embark upon a course of action via an indication of a selection, including, for example, pushing a key, clicking a mouse, maneuvering a pointer, touching a touch pad, touching a touch screen, acting out touch screen gesturing movements, maneuvering an electronic pen device over a screen, verbalizing voice commands, and/or by audible sounds. A user may include an end-user.

Flowcharts, also referred to as flow diagrams by some, are used in some figures herein to illustrate certain aspects of some examples. Logic they illustrate is not intended to be exhaustive of any, all, or even most possibilities. Their purpose is to help facilitate an understanding of this disclosure with regard to the particular matters disclosed herein. To this end, many well-known techniques and design choices are not repeated herein so as not to obscure the teachings of this disclosure.

Throughout this specification, the term "system" may, depending at least in part upon the particular context, be understood to include any method, process, apparatus, and/or other patentable subject matter that implements the subject matter disclosed herein. The subject matter described herein may be implemented in software, in combination with hardware and/or firmware. For example, the subject matter described herein may be implemented in software executed by a hardware processor.

It is to be understood, as used herein, the terms "user" or "users" include a subscriber and/or advertiser. Additionally, the terms "advertiser," "advertisers," or "advertiser account manager" as used herein means an individual, group of individuals, or an entity that creates data-field based templates to communicate information or data. The terms "subscriber" or "subscribers" as used herein means an individual that completes data-field based templates in order to communicate information with an advertiser or advertisers. The same individual, group of individuals, or entity may be both an advertiser and a subscriber.

The term "template" as used herein means an electronic assembly of defined types of input fields that is generated by an advertiser and completed by a subscriber, wherein the template defines how the subscriber directly communicates information to the advertiser in real-time in a single instance. In some embodiments, the template may be web-based since they are generated through a web browser. In other embodiments, the template may be generated through a mobile computing device, without the need for a web browser.

Referring to FIG. 1, FIG. 1 shows a system architecture diagram showing an exemplary system 100 for conducting two-way peer-to-peer communication. The system 100 allows a subscriber and an advertiser to exchange information and/or data between one another through the use of data-field based templates and private chat message. In some embodiments, the completed data-field based templates may be known as submissions. The system 100 is shown to include a subscriber mobile computing device 110, an advertiser computing device 120, and a two-way communication system 180. The two-way communication system 180 comprises a web server 130, a database server 140, an application program interface (API) server 150, and a document/image store 160. The subscriber mobile computing device 110 may be a laptop, tablet, cellular phone, handheld device, watch, or any other functionally equivalent device capable of running a mobile application. The advertiser computing device 120 may be a desktop computer, tablet, laptop, cellular phone, handheld device, watch, notebook computer, server computer, personal digital assistant, or any other functionally equivalent device known in the art.

The operating system on the subscriber mobile computing device 110 may be APPLE® iOS, GOOGLE ANDROID®, or WINDOWS®, or a functionally equivalent operating system. The operating system on the advertiser computing device 120 may be APPLE® iOS, GOOGLE ANDROID®, or WINDOWS®, LINUX®, or a functionally equivalent operating system. The operating system on the subscriber mobile computing device 110 and the operating system on the advertiser computing device 120 allow the respective user to communicate with the web server 130 for authentication and real-time communication. Each of the subscriber mobile computing device 110 and the advertiser computing device 120 may communicate with the API server 150 for data communication. Any images or documents that are displayed by advertisers on the subscriber computing device 110 or submitted by subscribers through the subscriber mobile computing device 110 are stored in the document/image store 160.

The web server 130 provides the web-based user interface for advertisers to manage accounts on the system 100. Examples of managing accounts on the system 100 include, but are not limited to, viewing data sent by subscribers, creating/editing data-field based templates, managing subscribers, and generating directed messages to and responding to directed messages from subscribers. The web server 130 communicates with the database server 140 when data from advertisers or subscribers is viewed/modified.

The API server 150 is the junction for most of the data transmitted/received by subscribers and the web server 130 presents data to an advertiser by gathering data from the API server 150. Third party service providers may communicate directly with the API server 150. In some embodiments, the system 100 can generate its own request to a third-party HTTP link by transmitting the data associated with the request from the subscriber. Examples of third party providers include those that have an established API that expose functionality with their systems over HTTP. These third-party providers can be programmed into the system 100 such that the third-party providers are notified by the system 100 when a specific type of event occurs, such as a request being submitted by a subscriber.

In the embodiment shown in FIG. 1, the web server 130 and the API server 150 are located on the same piece of hardware in the two-way communication system 180. In these embodiments, the piece of hardware refers to a server with an operating system and the two-way communication system 180 software that responds to communications overs the Internet. In other embodiments, the web server 130 and the API server 150 are located on different pieces of hardware.

The database server 140 provides access to databases for storing all data related to the system 100, including, but not limited to, advertiser accounts, templates, and data associated with the subscriber mobile computing device 110 and the advertiser computing device 120. The API server 150 serves as the central point for communications between the subscriber mobile computing device 110, the advertiser computing device 120, and Internet-connected third-party servers processing data. The API server 150 also processes data from advertisers when interacting with data on the web server 130.

A web-based client browser, executing on the advertiser computing device 120, may interact with a web-based user interface used by advertisers. Each connected session where the advertiser is connected to the system 100 will simultaneously receive data and information from the system 100 in real-time. The document/image store 160 provides a secure disk-based cloud storage device used for storing images and documents in well-known formats.

Data is transmitted from either the subscriber mobile computing device 110 or the advertiser computing device 120 to either the web server 130 or the API server 150 using a communication network, such as the Internet. In some examples, the TCP/IP protocol is used with SSL to ensure the security of the transmitted data. Examples of the type of data that is transmitted from the subscriber mobile computing device 110 to either the web server 130 or the API server 150 is the request type made by the subscriber, the subscriber's personally identifying information, and supplemental data associated with the request type made by the subscriber. Specifically, the subscriber transmits data that is marked as associated with an advertiser. The advertiser is notified by the system 100 when the data is received that is intended to be transmitted to the advertiser. The advertiser can then retrieve the information by accessing the web server 130, which in turn retrieves the data from the API server 150.

In some embodiments, the system 100 further comprises third-party service providers, such as a push notification service provider 170, as depicted in FIG. 1. When a real-time communication network is not present between a user's computing device and either the web server 130 or the API server 150, the API server 150 sends a push notification. Depending on the specific use of the system 100, push notifications may be sent to advertisers and/or subscribers, as described and shown herein.

Each of the web server 130, a database server 140, an application program interface (API) server 150 may have one or more processors capable of performing tasks, such as all or a portion of the methods described herein. Each of the web server 130, a database server 140, an application program interface (API) server 150 is in communication with and/or has integral memory in one or more examples. Memory may be any type of local, remote, auxiliary, flash, cloud, or other memory known in the art.

Figure 2:
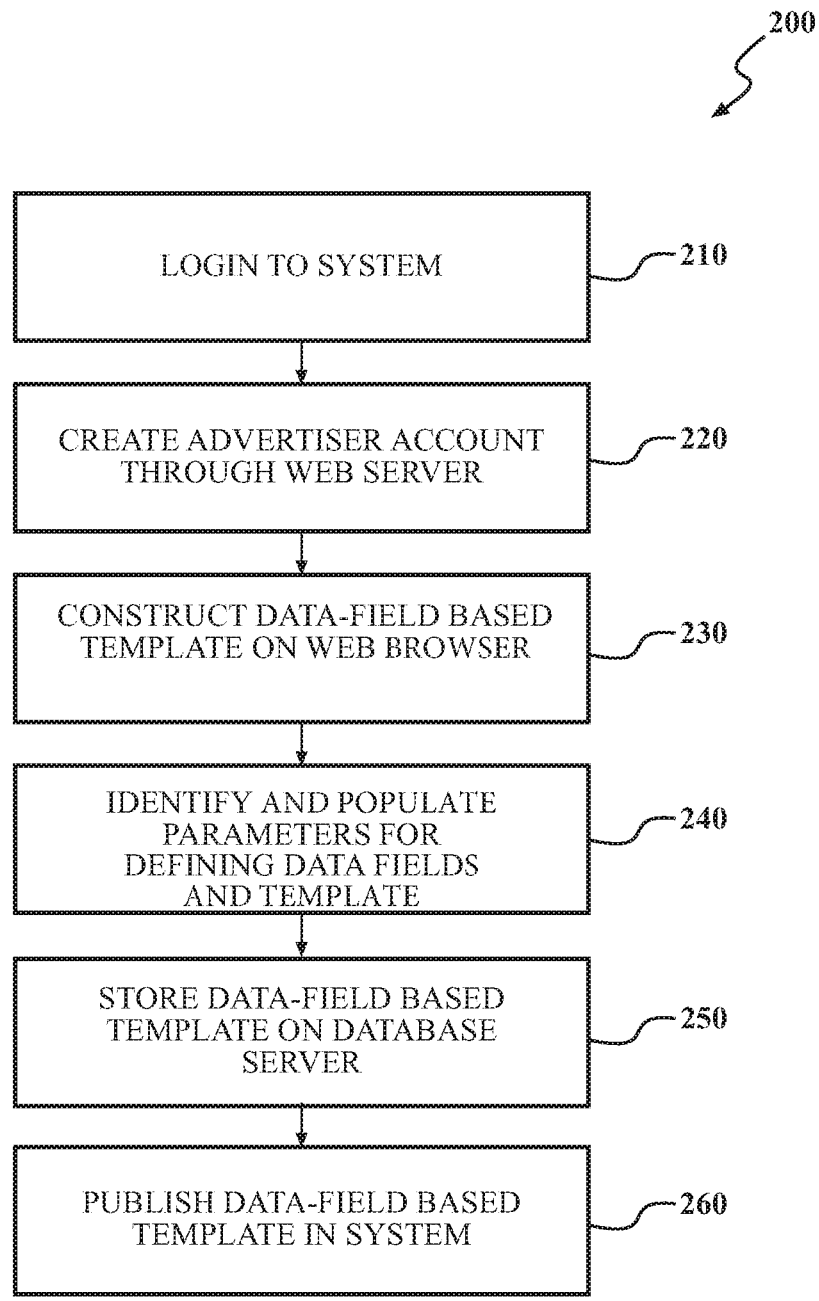
FIG. 2 is a flow chart showing an exemplary method for an advertiser to register and create a data-field based template on the system.

Referring to FIG. 2, FIG. 2 shows a flow chart showing an exemplary method 200 for an advertiser to register and create a data-field based template on the system 100. As shown in block 210, the method 200 commences with a user providing the necessary login information to access the system 100 for the first time. The system 100 initially considers the user to be a subscriber, but allows the user to become an advertiser. In block 220, the user becomes an advertiser by creating an advertiser account through the web server 130 by providing an individual name, group name, vendor name, and/or entity name. In addition, the user notes whether or not he or his entity will be listed in the public directory (viewable by all users) or as a private advertiser visible only to invited subscribers. The system 100 conducts preliminary verification of the address and phone number, if provided, for each individual or entity listed in the public advertiser directory. In addition, the system 100 may apply qualifiers or categorizations to the individual, group, or entity to distinguish its operation. Examples of such qualifiers or categorizations include dining, automotive, pet care, child care, etc.

As shown in block 230, the advertiser, using the advertiser computing device 120 or a web browser, constructs a data-field based template using the web-based user interface on a website operated by the system 100. Each data-field based template is specifically created by an advertiser with the name of the data-field based template and a description of the intended use of the data-field based template, which will be displayed to the subscriber.

Next, the advertiser identifies and populates a plurality of parameters associated with each data field and each data-field based template, as shown in block 240. The advertiser may use a visual toolbox to insert desired data fields into the data-field based template being constructed. In doing so, the advertiser may create a list of items in each data field for the subscriber to select from. The data fields are meant to define the types of input that an advertiser intends to receive from the subscriber. For example, the types of input that can be requested and captured by the advertiser through the data fields include such types as date, time, number increment/decrement, selection of a number of items from a list, selection of a single item from a list, toggle between yes and no, and/or free-form text. In some embodiments, the data fields can capture images, videos, and voice information from the subscriber and the data fields can represent data in such forms as text, pictures, html, and the like.

The advertiser may add an internal name to each data field created on the data-field based template. The internal name is a name given to a data field that is only displayed to the advertiser, which the advertiser will recognize more easily than a name displayed for a subscriber. For example, the name shown to the subscriber may be "SEATING FOR HOW MANY PEOPLE," while the internal name viewable by the advertiser may be "NUM PEOPLE." The advertiser determines a description for each data field to be displayed to the subscriber on the subscriber mobile computing device 110. The description is text that is displayed in near proximity to an input control on the subscriber mobile computing device 110 that describes the data requested by advertiser. In some embodiments, the advertiser may incorporate a default value for a data field, such as a default time or the number of people for a reservation. The default value may be based on previously established user preferences. In some embodiments, the advertiser may enter a plurality of word fragments or sentences to be displayed on the subscriber mobile computing device 110 as options for the subscriber to choose from.

The advertiser determines the type of each data field; the possible pre-defined values or options to select from; and whether the subscriber needs to input an answer for each data field in the data-field based template in order to submit the data-field based template to the advertiser. In some embodiments, while creating or editing a data-field based template, the advertiser may generate a visual preview of the completed data-field based template as it would appear on the subscriber mobile computing device 110.

In some embodiments, the advertiser sets a proximity value on the data-field based template. If the advertiser's physical address, such as a storefront, is designated and verified through the two-way communication system 180, the subscriber's GPS location must be within a predetermined radius of the advertiser's physical address for the subscriber to use the data-field based template.

The data-field based template configuration is stored independently of the data fields on the database server 140, as shown in block 250. The data fields on the data-field based template are stored independently so that they can be readily used in a plurality of data-field based templates created by the advertiser. In addition, the data fields can be readily referenced by the advertiser or the subscriber even if a specific data-field based template is removed. As a result, even if the data-field based template is removed or modified, the data fields may be used/re-used independent of the original data-field based template that they were created for.

For example, any subscriber submissions that were generated with an earlier version of the data-field based template can co-exist with current or future versions of the data-field based template. Consequently, it is much easier and quicker for the advertiser to re-construct future data-field based templates, particularly for the same subscriber(s).

As shown in block 260, after the data-field based template has been saved with the database server 140, the advertiser publishes the data-field based template in the system 100 to allow subscribers to view and complete. The advertiser specifically decides which data-field based templates should be published for a subscriber to view based on the specific subscriber tags that the advertiser has associated for that subscriber or whether the data-field based templates should be available for all subscribers. By way of example, an advertiser may tag a given subscriber as a long-term customer and only provide special incentives to that subscriber by associating a filter with that data-field based template so that only that subscriber is able to view that data-field based template. The subscriber can then view the data-field based template on the subscriber mobile computing device 110 to determine the types of requests the advertiser will accept. The system 100 does not send automatic messages notifying the subscriber of the creation of the data-field based template by the advertiser.

In some embodiments, the advertiser can send a direct message to the subscriber or a plurality of subscribers to provide notification that the data-field based template had been created and that it is ready to be viewed and completed. The notification message comprises a link that the subscriber can use to view the advertiser's data-field based template on the subscriber mobile computing device 110.

Figure 3:
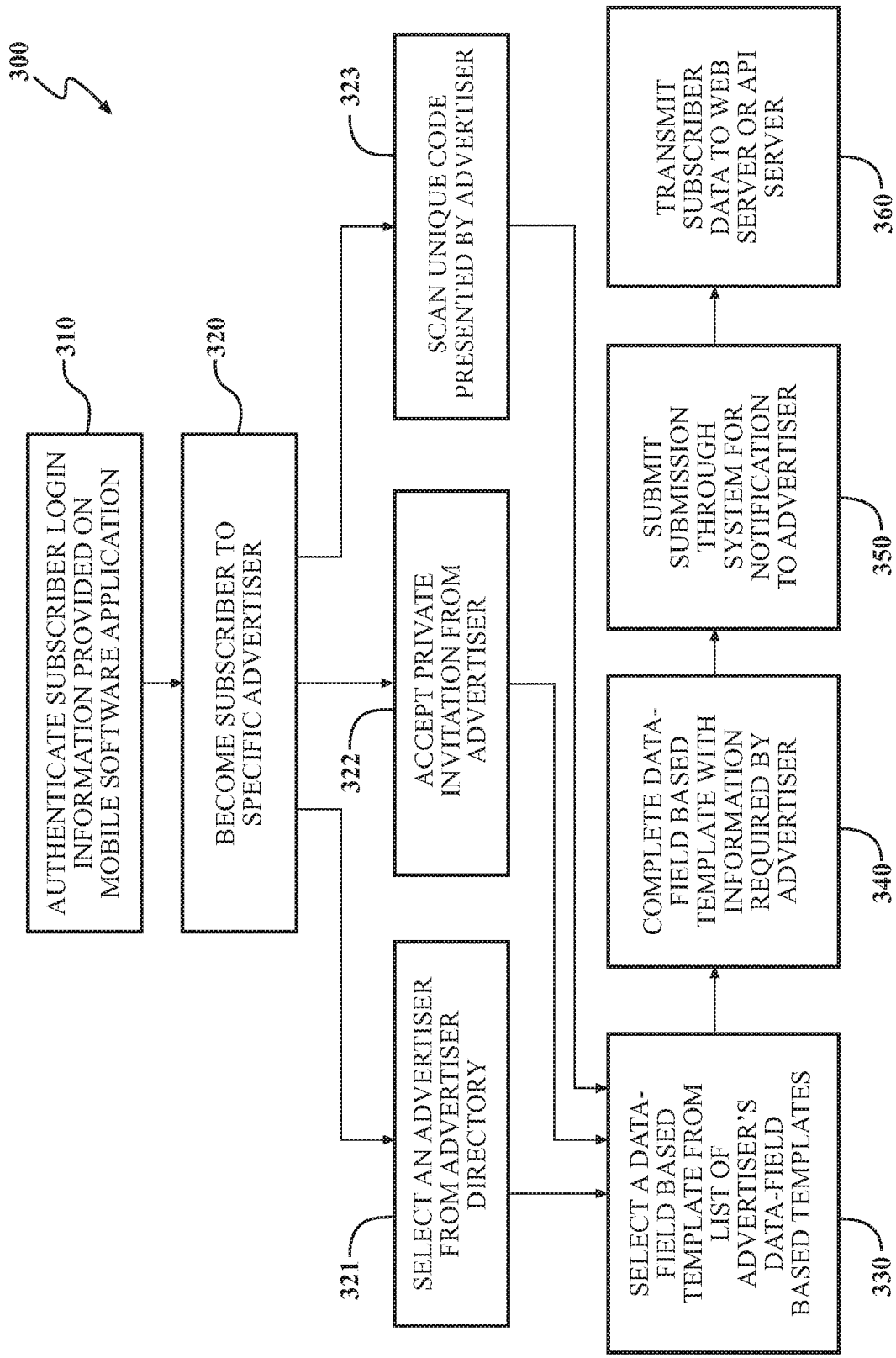
FIG. 3 is a flow chart showing an exemplary method for a user becoming a subscriber to an advertiser and the user completing the data-field based template created by the advertiser using the system.

Referring to FIG. 3, FIG. 3 shows a flow chart showing an exemplary method 300 for a user becoming a subscriber to an advertiser and the user completing the data-field based template created by the advertiser using the system 100. This method 300 commences when the system 100 authenticates the required login information provided by a subscriber on the subscriber mobile computing device 110, as shown in block 310. The subscriber provides the required information through a mobile software application configured to operate on the subscriber mobile computing device 110. The mobile software application is specific for the system 100. In some embodiments, after authentication is successful, the subscriber provides his personal information through a common template comprising built-in data fields, which is generated and stored by the system 100. These data fields may be referenced in advertiser-created data-field based templates to automatically populate data fields so that the subscriber can save time by choosing to pre-fill commonly needed personal information, such as address, phone numbers, names, etc.

In block 320, the user becomes a subscriber to a specific advertiser on the system 100 through one of three methods. In the first method, as shown in block 321, the user, using the subscriber mobile computing device 110, selects at least one advertiser by browsing a public directory of available advertisers in the system 100. Each advertiser comprises a name, description, and additional qualifiers or categorizations specifically pertaining to the advertiser, in order to allow the subscriber to distinguish one advertiser from another and to connect with a desired advertiser.

Once the subscriber has selected a desired advertiser, the subscriber adds the advertiser to his list of favorites using the subscriber mobile computing device 110. The mobile software application provides a page that allows the subscriber to add additional advertisers to the subscriber's list of favorites. In some embodiments, the subscriber can filter through the list of available advertisers by name, GPS vicinity, city/state/locale, or qualifiers or categorizations. Once the subscriber connects with a particular advertiser, the advertiser will be able to view the details for that subscriber.

In the second method, shown in block 322, the subscriber, through the subscriber mobile computing device 110, accepts a private invitation from the advertiser computing device 120. The advertiser uses the web server 130 to enter the name and email address of the desired recipient to send the invitation as an email message. If the desired recipient is already registered with the system 100 and has already downloaded the mobile software application, the invitation is displayed on the recipient's mobile computing device on the "Notifications" page of the mobile software application. The invitation also includes a link that allows the recipient to accept the invitation and connect with the advertiser. In some embodiments, the mobile software application may detect that the notification message is an invitation and present a button on the subscriber mobile computing device 110 for the subscriber to press in order to accept the invitation transmitted from the advertiser computing device 120. At this time, the user becomes a subscriber to the advertiser.

In the third method, shown in block 323, a user scans a unique code, using the subscriber mobile computing device 110, presented by an advertiser that has a physical location or media that supports visually displaying the unique code. Once the unique code is scanned, the user becomes a subscriber to that specific advertiser in real-time and can automatically access a specific data-field based template in the mobile software application. In some embodiments, the unique code may be located on the business counter display of the advertiser and the may be a barcode generated by the system 100.

If the desired recipient is not already registered with the system 100 or has not already downloaded the mobile software application, the recipient receives information for registration with the system 100 and accepts the invitation. In some embodiments, the recipient receives the registration information via email.

In some embodiments, such as where the subscriber selected the advertiser from a directory of listed advertisers on the mobile software application, the subscriber also completes an advertiser-specific common template. The system 100 prompts the mobile software application to request the advertiser-specific common template upon the subscriber adding an advertiser to the subscriber's favorites. In this embodiment, the advertiser may create profile data fields that may be referenced in the advertiser's data-field based templates that capture unique information and data commonly exchanged between the subscriber and the advertiser. The subscriber may complete the advertiser-specific common template either when the advertiser is added as a favorite or on-demand at a future time. By way of example, this pertains to a situation where a subscriber provides the name of a pet to a pet-boarding service advertiser.

As shown in block 330, the subscriber, using the subscriber mobile computing device 110, selects a data-field based template from the advertiser list of visible data-field based templates on the system 100. Data-field based templates without any configured data fields will not be displayed to the subscriber even though the data-field based template, itself, is enabled. In some embodiments, the advertiser can create a "notification-only" data-field based template that does not contain data fields that can be changed before submission. The "notification-only" template allows a subscriber to send canned/pre-populated data associated with a given user account in the system 100 for the purpose of a simple submission, such as sending a geolocation or notifying a friend that the subscriber has arrived at a destination.

The subscriber completes the data-field based template by filling in the required information requested by the advertiser, as shown in block 340. The advertiser can capture various types of data that is provided by the subscriber through the data-field based template. Examples of the type of data includes date, time, number increment/decrement, selection of a number of items from a list, selection of a single item from a list, toggle between yes and no, and/or free-form text. In some embodiments, the advertiser can also capture images, videos, and voice information from the subscriber.

Read-only data fields can be displayed alongside user input fields on the subscriber mobile computing device 110 when the subscriber views and completes the data-field based templates. In some embodiments, the read-only data fields display web links, pictures, video, text, audio, and contextual help information. The system 100 may automatically capture GPS information of the geolocation of the subscriber, if authorized by the subscriber and if the advertiser added geolocation to the data-field based template. In some embodiments, the input fields on the data-field based templates may capture specific functions of the subscriber mobile computing device 110, such as the orientation of the subscriber mobile computing device 110. In other embodiments, third parties may expand upon the types of data collected in the data fields by creating plug-in fields that can be referenced in data-field based templates created by advertisers.

In some examples, the advertiser may allow for the subscriber to make dynamic additions to the data-field based template. Instead of being defined, the data-field based template in these examples is fluid in the types of data that it can receive. As a result, the subscriber can provide additional/supplementary information that may be contextually important to the two-way communication between the advertiser and the subscriber, but was not specifically included in original data-fields authored by the advertiser. The data-field based template created by the advertiser then serves as the baseline template for the subscriber to begin providing information.

Next, the subscriber, using the subscriber mobile computing device 110, may transmit a submission to the system 100 that is marked as associated with an advertiser. The advertiser is notified by the system 100 when the submission intended for the advertiser is received. The advertiser can then retrieve the information in the submission through the advertiser computing device 120 by accessing the web server 130, as shown in block 350. The subscriber is able to quickly communicate a request of information to the advertiser through the mobile software application for various purposes, such as providing notification of a routine occurrence or requesting action by the advertiser on a specific task. By way of example, the subscriber can request a reservation with a pet boarding advertiser by simply completing and transmitting the required information on the data-field based template associated with the advertiser using the mobile software application on the subscriber mobile computing device 110. As a result, certain information and data can be more easily and conveniently transmitted from a single mobile software application, instead of having to call the particular pet boarding advertiser to make a reservation.

As shown in block 360, the data is transmitted from the subscriber mobile computing device 110 to either the web server 130 or the API server 150 using a communication network, such as the Internet. In some examples, the TCP/IP protocol is used with SSL to ensure the security of the transmitted data. Examples of the type of data that is transmitted from the subscriber mobile computing device 110 to either the web server 130 or the API server 150 is the request type made by the subscriber, the subscriber's personally identifying information, and supplemental data associated with the request type made by the subscriber.

Figure 4:
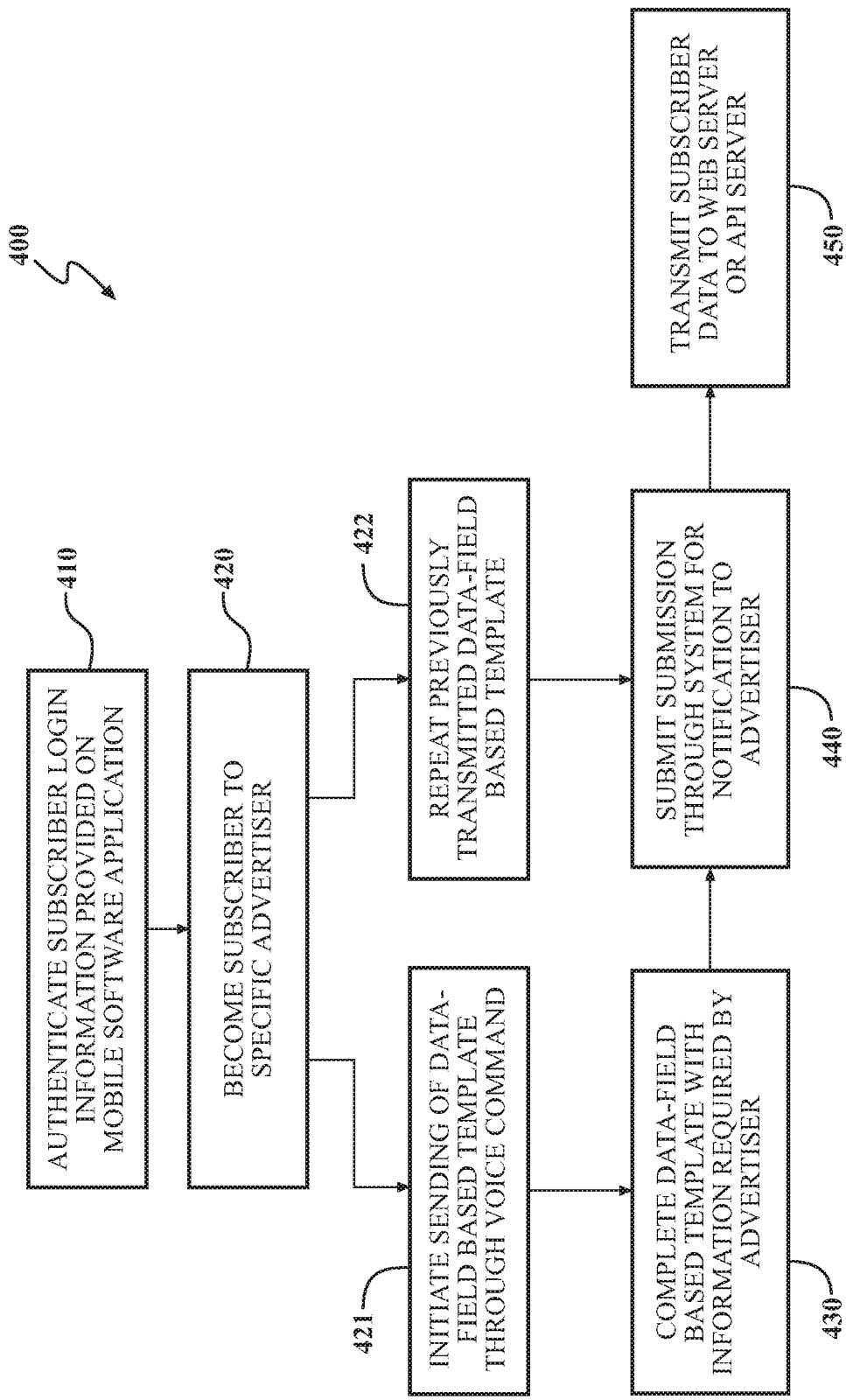
FIG. 4 is a flow chart showing another exemplary method for a user becoming a subscriber to an advertiser and the user completing the data-field based template created by the advertiser using the system.

Referring to FIG. 4, FIG. 4 shows a flow chart showing another exemplary method 400 for a user becoming a subscriber to an advertiser and the user completing the data-field based template created by the advertiser using the system 100. This method 400 commences when the system 100 authenticates the required login information provided by a subscriber on the subscriber mobile computing device 110, as shown in block 410. The subscriber provides the required information through a mobile software application configured to operate on the subscriber mobile computing device 110. The mobile software application is specific for the system 100. In some embodiments, the subscriber provides his personal information through a common template comprising built-in data fields, which is generated and stored by the system 100. These data fields may be referenced in advertiser-created data-field based templates to automatically populate data fields so that the subscriber can save time by choosing to pre-fill commonly needed data, such as address, phone numbers, names, etc.

In block 420, the user becomes a subscriber to a specific advertiser on the system 100. In some embodiments, the user uses voice command recognition to initiate sending a completed data-field based template ("submission"), as shown in block 421. The user can prompt the subscriber mobile computing device 110 to listen and interpret a voice command into either initiating the submission to be sent to the advertiser or to re-transmit a previously sent submission to the advertiser. In other embodiments, the user selects a previously transmitted submission and elects to send a duplicate of that submission to the advertiser, as shown in block 422. In these embodiments, all the data remains the same, except for some pieces of data, such as the time and geolocation.

If the subscriber uses voice command recognition to initiate sending a data-field based template, the subscriber will next complete the data-field based template by filling in the required information requested by the advertiser, as shown in block 430. The advertiser can capture various types of data that is provided by the subscriber through the data-field based template. Examples of the type of data includes date, time, number increment/decrement, selection of a number of items from a list, selection of a single item from a list, toggle between yes and no, and/or free-form text. In some embodiments, the advertiser can also capture images, videos, and voice information from the subscriber.

In other embodiments, the subscriber may transmit information or data associated with the submission from the subscriber mobile computing device 110 by scanning a unique code presented associated with the template constructed by the advertiser.

Read-only data fields can be displayed alongside user input fields on the subscriber mobile computing device 110 when the subscriber views and completes the data-field based templates. In some embodiments, the read-only data fields display web links, pictures, video, text, audio, and contextual help information. The system 100 may automatically capture GPS information of the geolocation of the subscriber, if authorized by the subscriber. In some embodiments, the input fields on the web-based templates may capture specific functions of the subscriber mobile computing device 110, such as the orientation of the subscriber mobile computing device 110. In other embodiments, third parties may expand upon the types of data collected in the data fields by creating plug-in fields that can be referenced in data-field based templates created by advertisers.

Next, the subscriber, using the subscriber mobile computing device 110, may submit a submission request to the advertiser computing device 120, as shown in block 440. The subscriber will proceed directly to block 440 if the subscriber elected to send a duplicate of a previously transmitted data-field based submission. The subscriber is able to quickly communicate a request of information to the advertiser through the mobile software application for various purposes, such as providing notification of a routine occurrence or requesting action by the advertiser on a specific task. By way of example, the subscriber can request a reservation with a pet boarding advertiser by simply completing and transmitting the required information on the data-field based template associated with the advertiser using the mobile software application on the subscriber mobile computing device 110. Each submission request a subscriber makes is stored with a unique identification number and permits repeatability so that the subscriber does not need to re-enter data again. As a result, certain information can be more easily and conveniently transmitted from a single mobile software application, instead of having to call the particular pet boarding advertiser each time a reservation is needed.

As shown in block 450, the data is transmitted from the subscriber mobile computing device 110 to the API server 150 using a communication network, such as the Internet. In some examples, the TCP/IP protocol is used with SSL to ensure the security of the transmitted data. Examples of the type of data that is transmitted from the subscriber mobile computing device 110 to the API server 150 is the request type made by the subscriber, the subscriber's personally identifying information, and supplemental data associated with the request type made by the subscriber.

Figure 5:
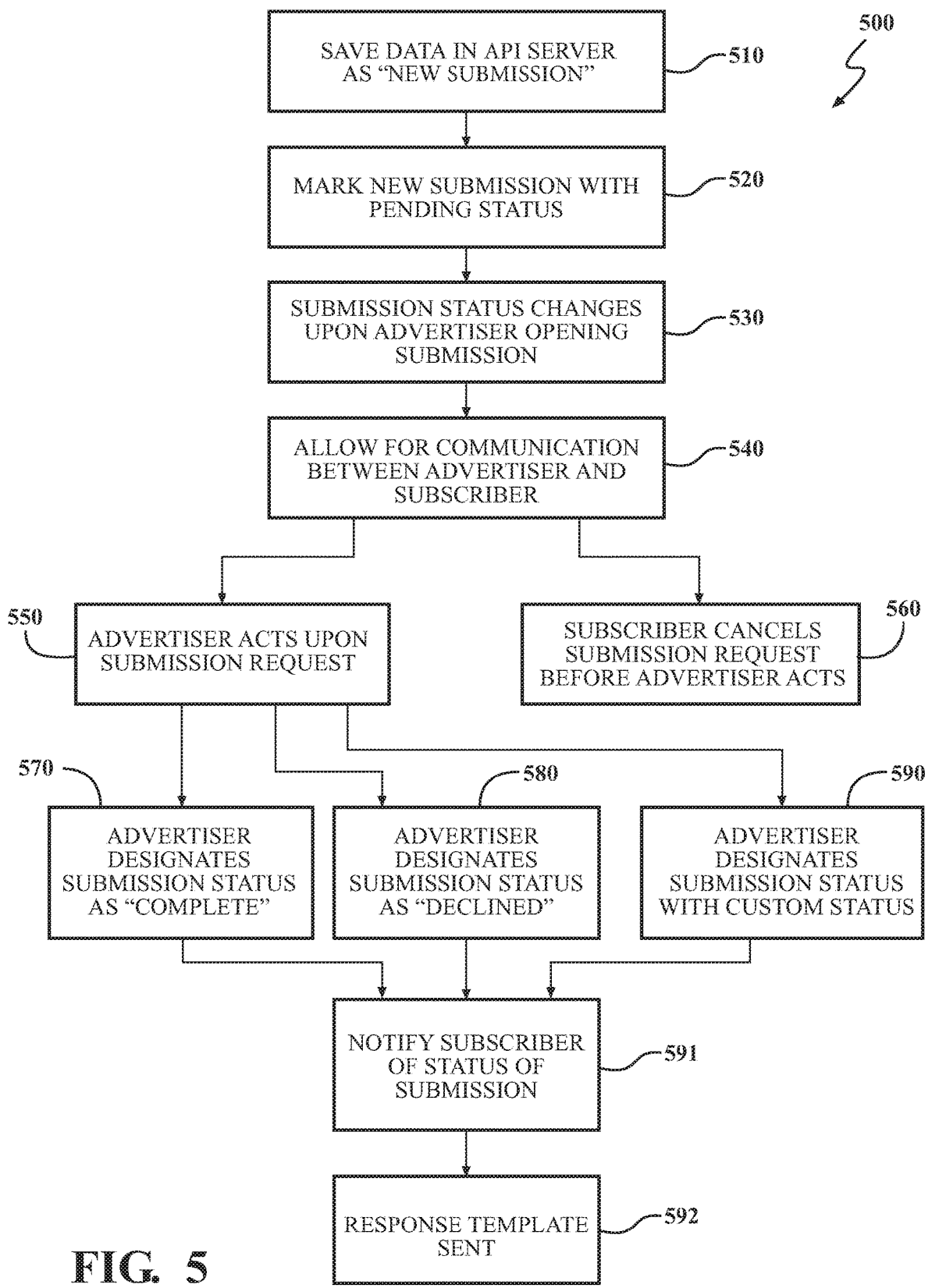
FIG. 5 is a flow chart showing an exemplary method for managing two-way communications between a subscriber and an advertiser after generation of a submission request.

Referring to FIG. 5, FIG. 5 shows a flow chart showing an exemplary method 500 for managing two-way communications between a subscriber and an advertiser after generation of a submission request. After the data is transmitted to the API server 150, the API server 150 stores the data in the system 100 as a "new submission," as shown in block 510. In block 520, the new submission is marked with a pending status in the system 100. For the subscriber, the new submission is visible in a status pending view of the mobile software application on the subscriber mobile computing device 110. In some embodiments, the mobile software application designates the new submission status as "Pending/Recent." The advertiser may be notified of the submission by push notification, email, and real-time notification of the event (if the advertiser has a current connection from the advertiser computing device 120).

After a data-field based template is generated by the advertiser, a plurality of rules may be created in the two-way communication system 180 to automatically act upon data once it is submitted by the subscriber (and in parallel to reaching the advertiser). The action may comprise creating a predetermined act or a response that reflects the information and data submitted by the second user. For example, in a situation where a data-field on a template requests the subscriber to select one value from a series of values, the rule may be to perform some electronic action, such as sending an email or text, if the value selected by the subscriber equates to a particular string.

As shown in block 530, the advertiser opens the submission, which causes a change in the submission status on the mobile software application. In some embodiments, the submission status may be designated as "in progress." The advertiser may open the submission either through the web-based user interface or the mobile software application. After the submission is opened, the advertiser and the subscriber may communicate with each other (via two-way communication) in a private chat format, as evidenced in block 540. The private chat may further refine any supplemental information or data needed from the subscriber's submission and integrate the status of the submission.

In some embodiments, the advertiser acts upon the request provided through the subscriber's submission, as shown in block 550. In other embodiments, the subscriber cancels the submission before the advertiser acts upon the submission provided by the subscriber, as shown in block 560. If the subscriber cancels the submission before the advertiser is able to act, the status of the submission may be marked as "cancelled" in the mobile software application.

If the advertiser acts upon the subscriber's submission, one of three possible events may occur. If the advertiser acts before the subscriber cancels, the subscriber is no longer able to cancel at that point. First, as shown in block 570, the advertiser designates the status of the submission as "complete" within the system 100 when no further action is needed for the submission. Second, as shown in block 580, the advertisers designates the status of the submission as "declined" within the system 100 if the advertiser refused submission. Third, as shown in block 590, the advertiser designates the status of the submission using a custom status that can replace or augment the existing status designations used in the system 100. In some embodiments, the built-in status designations in the system 100 are "PENDING," "IN PROCESS," "COMPLETED," "CANCELLED," and "DECLINED." In some embodiments, a third-party provider may be notified of the event when a submission request enters any completion states, such as "COMPLETED" or "DECLINED." The third-party provider may then act upon the event external of the system 100, such as by generating an invoice.

The subscriber is then notified on the subscriber mobile computing device 110 of the status of the submission, as shown in block 591. If the mobile software application is open on the subscriber mobile computing device 110 at the time the submission status is updated, the mobile software application is updated in real-time to reflect any change in the status of the submission. In some embodiments, the subscriber may also be notified of a confirmation number from the advertiser. In some embodiments, as shown in block 592, the advertiser can create templates that are used for responses only, in addition to sending a confirmation text to the subscriber mobile computing device 110. In some embodiments, the response templates can be canned/predetermined responses from the advertiser that reflect the data submitted by the subscriber.

In some embodiments, the two-way communication system 180 may be integrated with third-party providers, such as Amazon Alexa™ and Siri™, such that a request from other mobile devices may be received. This provides a subscriber with the "hands-free" ability to send a data-field based template to an advertiser. For example, the two-way communication system 180 may be integrated with Amazon Alexa™ such that a subscriber may use voice command recognition and state "Alexa, tell RushHive to Order Food from Store on My Block." The term "Order Food" can be a pre-defined template with selected values already created and the term "Store On My Block" is an advertiser connected with the subscriber.

Figure 6:
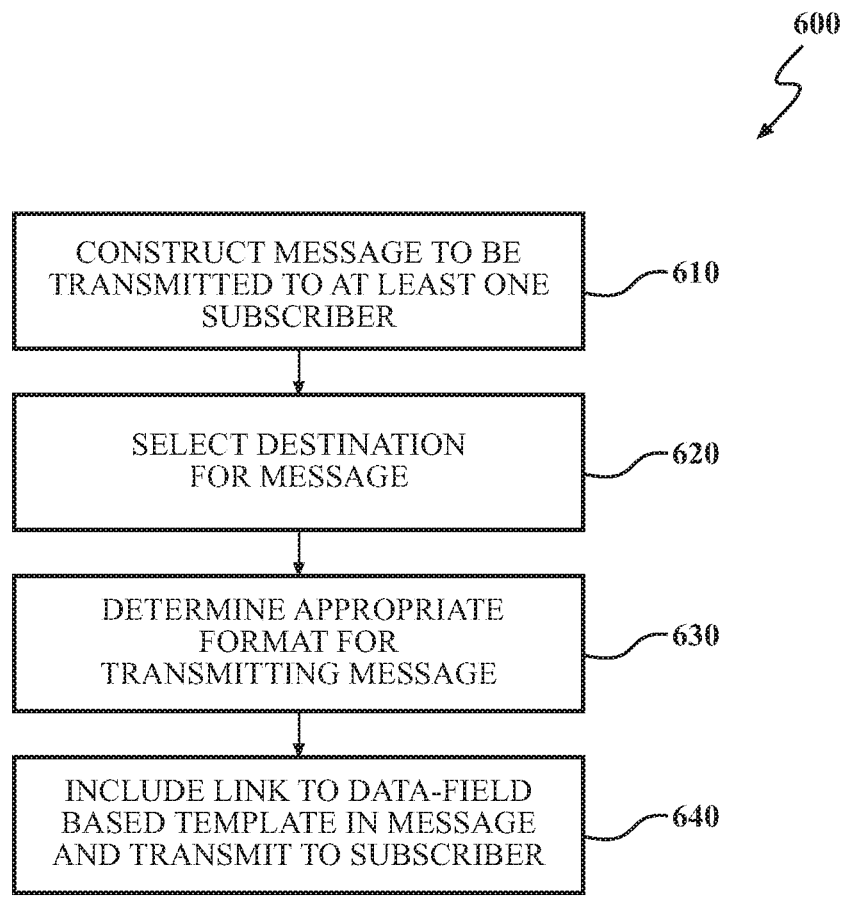
FIG. 6 is a flow chart showing an exemplary method for constructing and sending messages to an advertiser's subscribers.

Referring to FIG. 6, FIG. 6 shows a flow chart showing an exemplary method 600 for constructing and sending messages to an advertiser's subscribers. As shown in block 610, the advertiser constructs a message on the advertiser computing device 120 to be transmitted to at least one subscriber. In some embodiments, the advertiser may use the system 100 to transmit subscriber-specific information based on a specific submission request. In other embodiments, the advertiser may transmit targeted information or advertisements to an individual subscriber or a group of subscribers that may be most interested in the advertiser's goods and/or services.

As shown in block 620, the advertiser selects a destination for the message. The advertiser may select to send the message to an individual subscriber, all subscribers, or subscribers identified by one or more tags or categories for targeting the submission. By way of example, a pet boarding service may use tags to categorize subscribers as clients who have pets that use their daycare service for more than just overnight boarding. Thus, the system 100 can be used as a customer contact mechanism even if the subscriber has not yet associated with the advertiser. For those subscribers that have not added advertisers to the subscriber's favorites list may still receive messages from an advertiser.

In block 630, the advertiser determines the appropriate format for transmitting the message to the subscriber. Any direct communication from the advertiser to the subscriber (outside of private chat associated with a given submission) is transmitted to the subscriber's "Notification" page. If the user is an active subscriber of an advertiser, the system 100 does not send an email message to the subscriber since it would be a duplicating notification. If the user that is being directed mail to is not currently a subscriber, the user gets communication from the system 100 over web-based email.

In some embodiments, the advertiser may transmit the message to the subscriber through web-based email. In other embodiments, the subscriber comes within range of the advertiser's physical location or the advertiser schedule a delivery for the subscriber at a specific date and time. In block 640, the advertiser includes a link to the data-field based template and transmits the directed message to the subscriber(s).

A plurality of advertiser accounts may be securely hosted on the same system 100 that manages the data and information for subscribers and their subscriber mobile computing device 110. One advertiser account in the system 100 may be associated with a plurality individual client accounts and conversely, a single client account can be associated with a plurality of advertiser accounts. If a manager of an advertiser account is on the web-based user interface, the manager may instantly receive notifications about subscriber submissions and messages. In some embodiments, the notifications are distributed to any management nodes registered with an active connection associated with a specific advertiser account in the system 100. As a result, a plurality of computing devices (mobile or desktop) may be used for monitoring the activity of the same advertiser account and be aware of requests (whether from other managers or subscribers) as soon as they occur.

Figure 7:
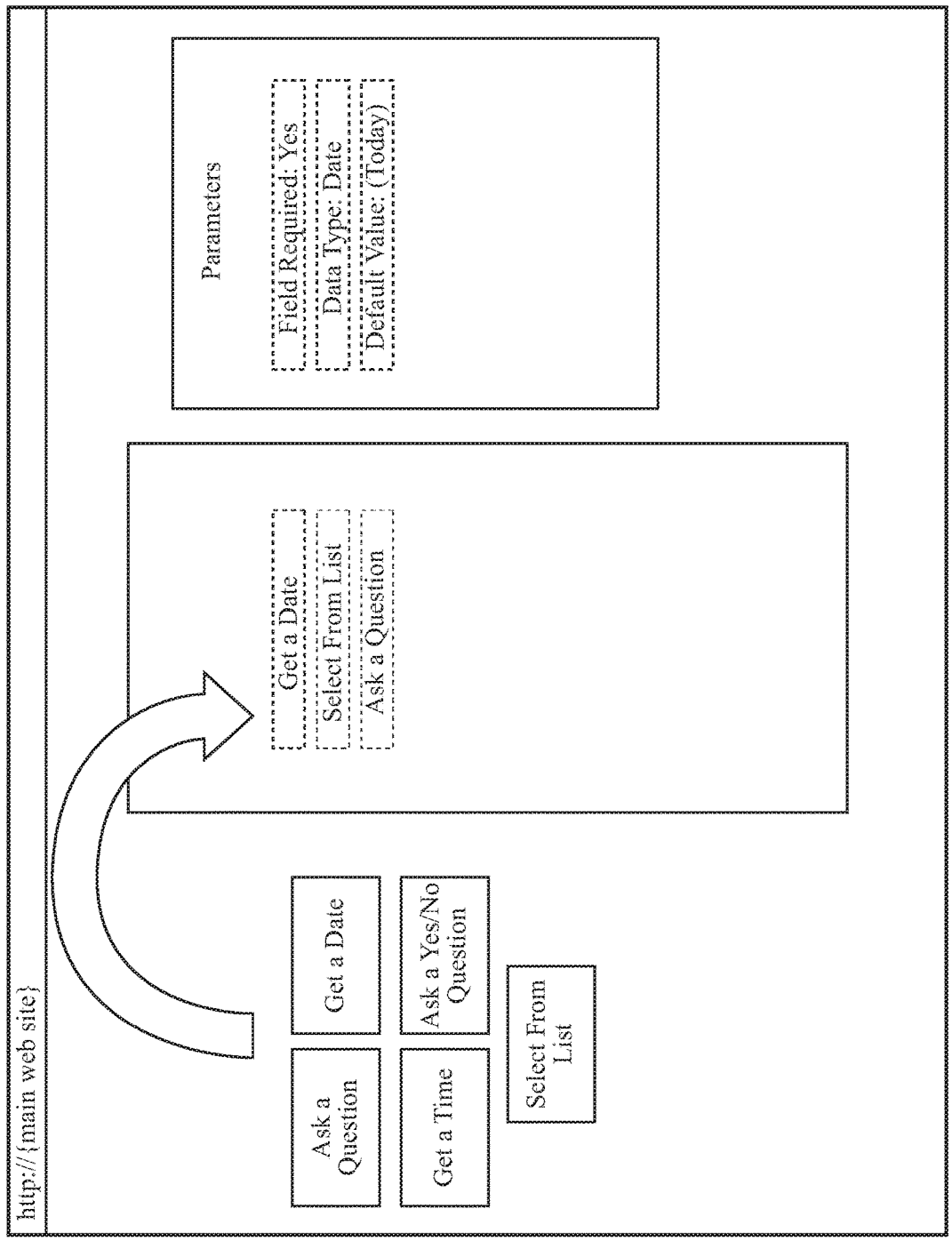
FIG. 7 is a graphical user interface drawing illustrating an example GUI for constructing a data-field based template comprising parameters associated with the data-field in the data-field based template.

Referring to FIG. 7, FIG. 7 shows a graphical user interface (GUI) drawing illustrating an example GUI for constructing a data-field based template comprising parameters associated with the data-field in the data-field based template. The data-field based template may be constructed by the advertiser/advertiser account manager through the advertiser computing device 120. The advertiser/advertiser account manager may construct the data-field based template with defined types of input that the subscriber will enter data into and submit back to the advertiser. In this particular embodiment, the parameters defining the data field on the data-field based template are data field, data type, and default value.

Figure 8:
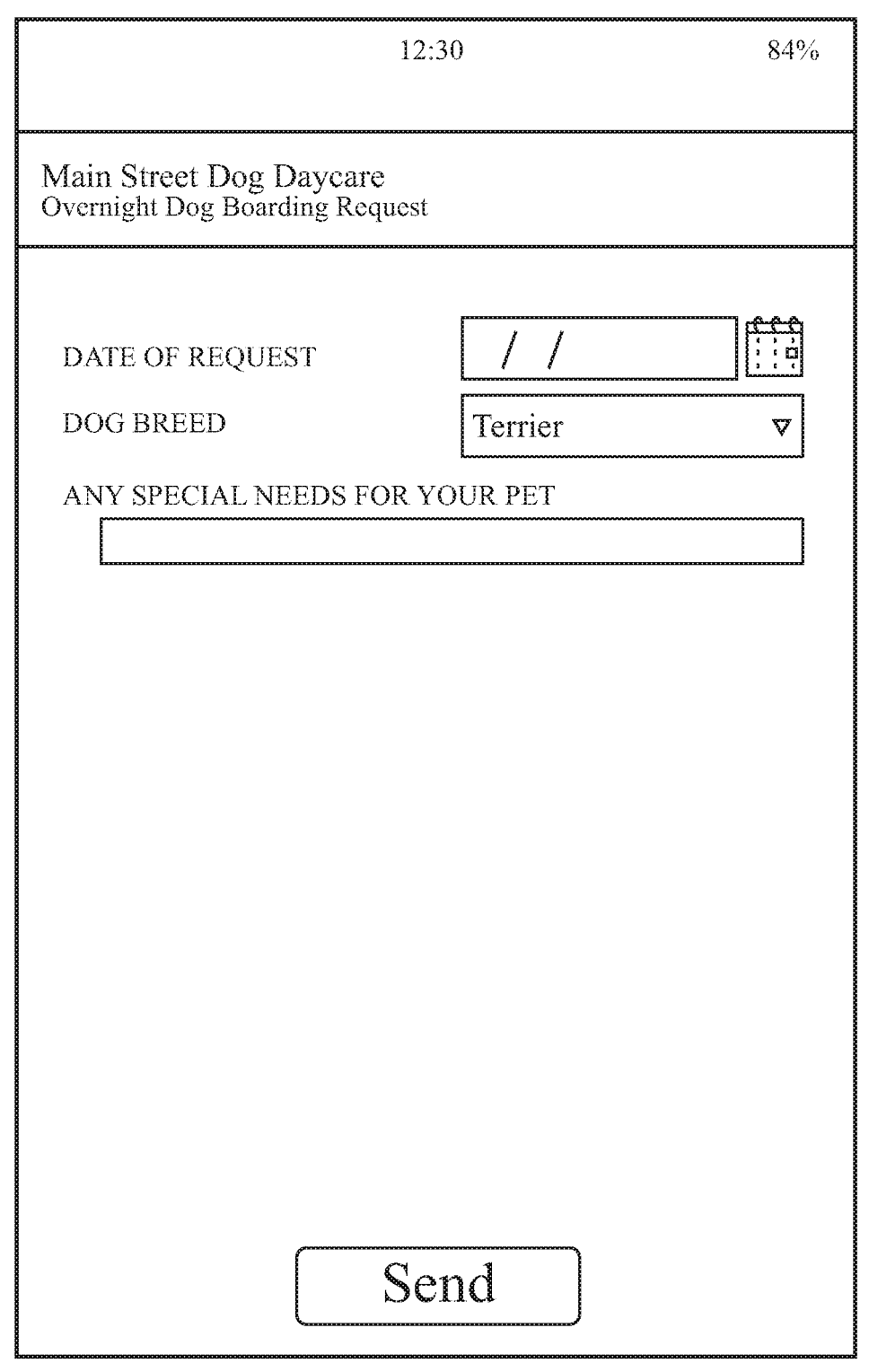

The proper user interface controls for entering the types of input will be generated at run-time on the subscriber mobile computing device 110 based on the type of input the advertiser expects to receive, as shown in FIG. 8. The advertiser/advertiser account manager may readily modify, add, or remove any of the data fields in the data-field based template and integrate any previously created data fields from other data-field based templates.

A computing platform may be utilized to embody tangibly a computer program and/or graphical user interface, such as a web portal, by providing hardware components on which the computer program and/or GUI may be executed.

Referring to FIG. 9, FIG. 9 shows a graphical user interface drawing illustrating an example GUI of the subscriber's advertisers. The depiction in FIG. 9 shows the subscriber's "Favorites page" viewable through the subscriber mobile computing device 110. This refers to the advertisers that the subscriber has chosen to be linked to. The mobile software application first presents a selection of advertiser accounts for the subscriber to select from broken down by geographical location. In some embodiments, the advertiser may not be publicly displayed in the advertiser directory and only associated with subscribers by a private invitation. In some embodiments, the advertiser may not be associated with a specific geographical location.

Figure 10:
FIG. 10 is a graphical user interface drawing illustrating an example GUI of the data-field based templates available from an advertiser.
Figure 10:
Figure 10:

Referring to FIG. 10, FIG. 10 shows a graphical user interface drawing illustrating an example GUI of the data-field based templates available from an advertiser. After opening a specific advertiser, the subscriber can view on the subscriber mobile computing device 110 the data-field based templates offered by that advertiser within the mobile software application. Each data-field based template comprises a name and a short description that the advertiser has chosen to display for the subscriber.

Figure 11:
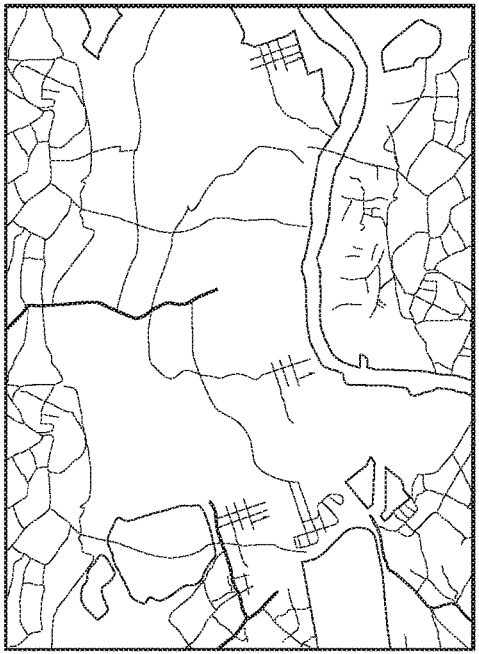
FIG. 11 is a graphical user interface drawing illustrating an example GUI of a page in the web portal showing a user interface on the advertiser computing device.

Referring to FIG. 11, FIG. 11 shows a graphical user interface drawing illustrating an example GUI of a page in the web portal showing a user interface on the advertiser computing device 120. In this depiction, the advertiser can view a subscriber's submission for a baked bread order.

Referring to FIG. 12, FIG. 12 shows a graphical user interface drawing illustrating an example GUI of a page in the mobile software application showing a summary view of the status of recent and open submissions for a subscriber. The summary view allows a subscriber to quickly understand the status of his/her recent and open submissions to all of his/her advertisers. In the exemplary depiction illustrated in FIG. 12, the subscriber's requests and communications to various advertisers are categorized by status, such as "Pending," "In Progress," "Completed," and "Declined." The summary view lists the types of interactions between the subscriber and the advertiser by advertiser name.

The system 100 and methods described herein may provide a number of functions and services to users in order to make it easier for users to communicate patterns of data to each other. Specifically, the invention described herein brings aspects of a user's life where routine communication occurs into a central system 100 for quickly and easily communicating patterns of data to another user. Non-limiting examples of such functions and service include pet/child daycare, hair care, dry cleaning, car sales, restaurant, delivery, shopping, employer/employee relations, and interactions with family members. The system 100 offers the subscriber a way to automate common tasks in life through a single mobile software application. The system 100 provides the advertiser with a connection to subscribers that are most interested in the information provided by the advertiser.

By way of example, the system 100 and methods described herein may be used by an electrical service company with field technicians. The field technicians may use the system 100 to track their time, account for when/when they arrived during work, take pictures of their work, and submit all of this information and data to a home office while they are traveling. The home office may use the system 100 to create templates that capture the information and data to be received from the field technicians, such as the GPS location of each field technician, and communicate with the field technicians during individual jobs.

In another example, a restaurant uses the system 100 and methods described herein to allow its customers to reserve tables, check-in to a reservation without approaching the host desk, and place food orders online for takeout. Specifically, the restaurant creates templates for each of the aforementioned services, which involve its customers scanning a unique code at the front door of the restaurant so that the restaurant is aware when a specific customer arrives.

The figures provided herein are merely representational and may not be drawn to scale. Certain proportions thereof may be exaggerated, while others may be minimized. Accordingly, the specification and drawings are to be regarded in an illustrative rather than a restrictive sense. It will, of course, be understood that, although particular embodiments have just been described, the claimed subject matter is not limited in scope to a particular embodiment or implementation. Likewise, an embodiment may be implemented in any combination of systems, methods, or products made by a process, for example.

In the preceding description, various aspects of claimed subject have been described. For purposes of explanation, specific numbers, systems, and/or configurations were set forth to provide a thorough understanding of claimed subject matter. Computer file types and languages, and operating system examples have been used for purposes of illustrating a particular example. However, it should be apparent to one skilled in the art having the benefit of this disclosure that claimed subject matter may be practiced with many other computer languages, operating systems, file types, and without these specific details. In other instances, features that would be understood by one of ordinary skill were omitted or simplified so as not to obscure claimed subject matter. While certain features have been illustrated or described herein, many modifications, substitutions, changes or equivalents will now occur to those skilled in the art. It is, therefore, to be understood that claims are intended to cover all such modifications or changes as fall within the true spirit of claimed subject matter.

The invention claimed is:

1. A method of two-way communication between two users in a system, the method comprising:
   connecting a first user with a second user;
   constructing, via a first user computing device, at least one template associated with the first user;
   inserting, using the first user computing device, at least one data field into the template, the at least one data field defines information or data requested by the second user;
   populating a plurality of data field-specific parameters associated with each data field and populating a plurality of template-specific parameters associated with each template;
   storing the template on a database server;
   publishing, using an API server, the template in the system for display to the second user;
   selecting, using a second user mobile computing device, one of the at least one templates;
   populating, using the second user mobile computing device, at least one of the data fields in the template and responding to data or information requested in at least one data field of the template;
   transmitting to the system, using the second user mobile computing device, a submission comprising the template completed by the second user and storing the submission on the database server;
   transmitting data associated with the submission, using the API server, from the database server to the first user computing device;
   notifying, using the API server, the first user that the submission has been received by the API server and is ready to be accessed;
   dynamically generating a predetermined act or a response to the information or data provided to the first user in the submission submitted by the second user;
   marking, using the first user computing device, the submission with a status update for display on the second user mobile computing device; and
   commencing real-time and direct two-way communication between the first user and the second user until the status update associated with the submission is designated as being terminated, wherein the two-way communication is a private communication between the first user and the second user.

2. The method of claim 1, the data field-specific parameters comprising a data type, a field description, a field name, and/or a field default value and the template-specific parameters comprising a proximity value, a template description, and a template name.

3. The method of claim 1, the method further comprising dynamically updating the second user mobile computing device with a plurality of communications and status updates associated with a plurality of the templates at the same time.

4. The method of claim 1, the method further comprising sending a notification message to the second user mobile computing device that the template has been constructed and is ready to be viewed, wherein the notification message comprises a link for where the template is located.

5. The method of claim 1, the method further comprising, prior to selecting one of the least one templates constructed by the first user, the second user becoming a subscriber to the first user.

6. The method of claim 5, the second user becoming a subscriber to the first user by accepting an invitation transmitted from the first user computing device and/or by scanning a unique code associated with the first user.

7. The method of claim 1, transmitting information or data associated with the submission from the second user mobile computing device via voice command recognition or scanning of a unique code associated with the template.

8. The method of claim 1, the status update of the submission is determined based on one or more of the following: whether no action is needed, whether additional action is needed, and whether the first user refused the submission.

9. The method of claim 1, the method further comprising, prior to selecting one of the at least one templates associated with a first user, providing information or data, using the second user mobile computing device, directly to the system, the information or data is adapted for populating subsequent data fields in the template.

10. A system for two-way communication between two users, the system comprising:
- a first user computing device configured to construct at least one template associated with a first user, to insert at least one data field into the template, to populate a plurality of data field-specific parameters associated with each data field, to populate a plurality of template-specific parameters associated with each template, to dynamically generate a predetermined act or a response to the information or data provided to the first user in a submission submitted by a second user, and to mark the submission comprising the template completed by the second user with a status update for display on a second user mobile computing device;
- the second user mobile computing device configured to select one of the templates, to populate at least one of the data fields in the template with data or information in response to the information or data requested in the template, and to transmit the submission to the system;
- at least one database server configured to store the template from the first user computing device and the submission from the second user mobile computing device;
- at least one API server configured to publish the template for display to the second user, to transmit data associated with the submission from the database server to the first user computing device or a web server and to notify the first user that the submission has been received by the API server and is ready to be accessed; and
- a computing platform with a graphical user interface configured for display of the information and data transmitted between the first user and the second user, wherein the communication between the first user and the second user is a private communication conducted in real-time.

11. The system of claim 10, the data field-specific parameters comprising a data type, a field description, a field name, and/or a field default value and the template-specific parameters comprising a proximity value, a template description, and a template name.

12. The system of claim 10, each of the at least one data fields is configured to capture images, videos, and/or voice information from the second user.

13. The system of claim 10, the system further comprising a document/image store configured to store any images or documents submitted or displayed on the first user computing device or second user mobile computing device.

14. The system of claim 10, the web server provides a web-based user interface configured for viewing data and information transmitted from the second user mobile computing device and stored on the API server, for dynamically creating and editing the template, for generating and responding to messages among users, and for managing accounts associated with the first user and the second user.

15. The system of claim 10, the status update of the submission is determined based on one or more of the following: whether no action is needed, whether additional action is needed, and whether the first user refused the submission.

16. A non-transitory computer readable medium storing instructions thereon that, when executed by at least one processor, cause the at least one processor to:
- construct, from a web browser or a first user computing device, at least one web-based template associated with a first user;
- insert, using the first user computing device, at least one data field into the template; the at least one data field defines information or data requested from at least one second user;
- populate a plurality of data field-specific parameters associated with each data field and a plurality of template-specific parameters associated with each template;
- store the template on a database server;
- publish, using an API server, the template in the system for display to a second user;
- select, using a second user mobile computing device, one of the at least one templates;
- populate, using the second user mobile computing device, at least one of the data fields in the template and respond to the information or data requested in the template;
- transmit to the system, using the second user mobile computing device, a submission comprising the template completed by the second user and store the submission on the database server;
- transmit data associated with the submission, using the API server, from the database server to the first user computing device;
- notify, using the API server, the first user that the submission has been received by the API server and is ready to be accessed;
- dynamically generate a predetermined act or a response to the information or data provided to the first user in the submission submitted by the second user;
- mark, using the first user computing device, the submission with a status update for display on the second user mobile computing device; and
- commence two-way communication in real-time between the first user and the second user until the status update associated with the submission is designated as being terminated, wherein the two-way communication is a private communication between the first user and the second user.

* * * * *